United States Patent
Yang et al.

(10) Patent No.: US 10,573,879 B2
(45) Date of Patent: Feb. 25, 2020

(54) ELECTROLYTES AND METHODS FOR USING THE SAME

(71) Applicant: GM GLOBAL TECHNOLOGY OPERATIONS LLC, Detroit, MI (US)

(72) Inventors: Li Yang, Troy, MI (US); Qiangfeng Xiao, Troy, MI (US); Mei Cai, Bloomfield Hills, MI (US); Meng Jiang, Rochester Hills, MI (US); Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 468 days.

(21) Appl. No.: 15/115,870

(22) PCT Filed: Feb. 9, 2015

(86) PCT No.: PCT/US2015/015003
§ 371 (c)(1),
(2) Date: Aug. 1, 2016

(87) PCT Pub. No.: WO2015/126649
PCT Pub. Date: Aug. 27, 2015

(65) Prior Publication Data
US 2017/0162859 A1    Jun. 8, 2017

Related U.S. Application Data

(60) Provisional application No. 61/941,068, filed on Feb. 18, 2014.

(51) Int. Cl.
*H01M 4/04* (2006.01)
*H01M 4/38* (2006.01)
(Continued)

(52) U.S. Cl.
CPC ....... *H01M 4/0445* (2013.01); *H01M 4/0461* (2013.01); *H01M 4/134* (2013.01);
(Continued)

(58) Field of Classification Search
CPC ......... H01M 10/0525; H01M 10/0568; H01M 10/0569; H01M 4/0445; H01M 4/38;
(Continued)

(56) References Cited

U.S. PATENT DOCUMENTS 5,851,504 A * 12/1998 Barker ............... C04B 35/524
423/447.2
6,395,431 B1 * 5/2002 Gao ............... H01M 10/0525
429/326
(Continued)

FOREIGN PATENT DOCUMENTS

CN    102509810    *  6/2012
CN    102509810 A  *  6/2012
(Continued)

OTHER PUBLICATIONS

Elazari et al. ("Li Ion Cells Comprising Lithiated Columnar Silicon Film Anodes, TiS2 Cathodes and Fluoroethyene Carbonate (FEC) as a Critically Important Component", Journal of the Electrochemical Society, Aug. 14, 2012, (Year: 2012) (Document provided by Applicant in Application on Aug. 10, 2016).*
(Continued)

*Primary Examiner* — Ula C Ruddock
*Assistant Examiner* — Thomas H. Parsons
(74) *Attorney, Agent, or Firm* — Harness, Dickey & Pierce, P.L.C.

(57) ABSTRACT

In an example of a method for enhancing the performance of a silicon-based negative electrode, the silicon-based negative electrode is pre-lithiated in an electrolyte including a lithium salt dissolved in a solvent mixture of dimethoxy-
(Continued)

ethane (DME) and fluoroethylene carbonate (FEC). The DME and FEC are present in a volume to volume ratio ranging from 10 to 1 to 1 to 10. The pre-lithiation forms a stable solid electrolyte interface layer on an exposed surface of the negative electrode.

14 Claims, 3 Drawing Sheets

(51) Int. Cl.
| | |
|---|---|
| *H01M 10/0568* | (2010.01) |
| *H01M 10/0569* | (2010.01) |
| *H01M 4/134* | (2010.01) |
| *H01M 10/052* | (2010.01) |
| *H01M 10/0567* | (2010.01) |
| *H01M 4/1395* | (2010.01) |
| *H01M 10/0525* | (2010.01) |

(52) U.S. Cl.
CPC ........... *H01M 4/1395* (2013.01); *H01M 4/38* (2013.01); *H01M 4/386* (2013.01); *H01M 10/052* (2013.01); *H01M 10/0525* (2013.01); *H01M 10/0567* (2013.01); *H01M 10/0568* (2013.01); *H01M 10/0569* (2013.01); *H01M 2300/0025* (2013.01); *H01M 2300/0034* (2013.01)

(58) Field of Classification Search
CPC .... H01M 4/386; H01M 4/0462; H01M 4/134; H01M 4/1395; H01M 10/0567
See application file for complete search history.

(56) References Cited

U.S. PATENT DOCUMENTS

| | | | |
|---|---|---|---|
| 7,037,624 B2 * | 5/2006 | Yew ................. | H01M 10/0525 429/324 |
| 8,663,840 B2 | 3/2014 | Nazri et al. | |
| 8,685,567 B2 * | 4/2014 | Park ...................... | H01M 4/485 429/199 |
| 8,846,251 B2 * | 9/2014 | Cui ...................... | H01M 4/0421 429/231.8 |
| 8,974,946 B2 | 3/2015 | Cai et al. | |
| 8,999,584 B2 | 4/2015 | Jiang et al. | |
| 9,028,565 B2 | 5/2015 | Huang | |
| 9,093,705 B2 | 7/2015 | Xiao et al. | |
| 9,123,939 B2 | 9/2015 | Xiao et al. | |
| 9,142,830 B2 | 9/2015 | Xiao et al. | |
| 9,153,819 B2 | 10/2015 | Huang et al. | |
| 9,160,036 B2 | 10/2015 | Yang et al. | |
| 9,178,250 B2 * | 11/2015 | Blanc ................ | H01M 10/0585 |
| 9,350,046 B2 | 5/2016 | Huang | |
| 9,362,551 B2 | 6/2016 | Sachdev et al. | |
| 9,362,552 B2 | 6/2016 | Sohn et al. | |
| 9,537,144 B2 * | 1/2017 | Huang ................. | H01M 4/364 |
| 2012/0045670 A1 * | 2/2012 | Stefan ................. | H01M 4/0421 429/61 |
| 2012/0082890 A1 * | 4/2012 | Dong ..................... | H01G 9/038 429/188 |
| 2012/0225346 A1 * | 9/2012 | Hoshina ................ | H01M 4/485 429/156 |
| 2012/0229096 A1 | 9/2012 | Nazri | |
| 2012/0231321 A1 | 9/2012 | Huang et al. | |
| 2013/0284338 A1 | 10/2013 | Xiao et al. | |
| 2014/0272526 A1 | 9/2014 | Huang | |
| 2014/0272558 A1 | 9/2014 | Xiao et al. | |
| 2015/0014890 A1 | 1/2015 | Xiao | |
| 2016/0111721 A1 | 4/2016 | Xiao et al. | |

FOREIGN PATENT DOCUMENTS

| | | | |
|---|---|---|---|
| CN | 105960732 A | | 9/2016 |
| DE | 112015000403 T5 | | 11/2016 |
| KR | 20120092529 | | 8/2012 |
| WO | WO2012047596 | * | 7/2012 |

OTHER PUBLICATIONS

Elazari et al. "Rechargeable lithiated silicon-sulfur (SLS) battery prototypes", Electrochemistry Communications, 2012, vol. 14, No. 1, pp. 21-24) (Year: 2012) (Document provided by Applicant in Application on Aug. 10, 2016).*

Yang, et al.; Surface reactions and performance of non-aqueous electrolytes with lithium metal anodes; Journal of Power Sources; 2008; vol. 185; pp. 1359-1366.

Xiong, et al.; "Effect of LiBOB as additive on electrochemical properties of lithium-sulfur batteries" Ionics; 2012; vol. 18; pp. 249-254.

Elazari, et al.; Rechargeable lithiated silicon-sulfur (SLS) battery prototypes; Electrochemistry Communications; 2012; vol. 14; pp. 21-24.

Elazari, et al.; Li ion cells comprising lithiated columnar silicon film anodes, TiS2 cathodes and fluoroethyene carbonate (FEC) as a critically improtant component; ECS; 2012; vol. 159; pp. A1440-A1445.

International Search Report and Written Opinion for International Application No. PCT/US2015/015003 dated Jun. 29, 2015, 15 pages.

First Office Action and Search Report for Chinese Application No. 201580007154.6 dated Jan. 12, 2018 with English language machine translation; 16 pages.

Second Office Action and Search Report for Chinese Application No. 201580007154.6 dated Jun. 12, 2018 with correspondence dated Jun. 14, 2018 from China Patent Agent (H.K.) Ltd. summarizing contents; 4 pages.

* cited by examiner

ELECTROLYTES AND METHODS FOR USING THE SAME

CROSS-REFERENCE TO RELATED APPLICATIONS

This application claims the benefit of U.S. Provisional Patent Application Ser. No. 61/941,068, filed Feb. 18, 2014, which is incorporated by reference herein in its entirety.

BACKGROUND

Secondary, or rechargeable, lithium-sulfur batteries or lithium ion batteries are often used in many stationary and portable devices, such as those encountered in the consumer electronic, automobile, and aerospace industries. The lithium class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

In an example of a method for enhancing the performance of a silicon-based negative electrode, the silicon-based negative electrode is pre-lithiated in an electrolyte including a lithium salt dissolved in a solvent mixture of dimethoxyethane (DME) and fluoroethylene carbonate (FEC). The DME and FEC are present in a volume to volume ratio ranging from 10 to 1 to 1 to 10. The pre-lithiation forms a stable solid electrolyte interface layer on an exposed surface of the silicon-based negative electrode.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Lithium-sulfur and lithium ion batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. Each of the electrodes is also associated with respective current collectors, which are connected by an interruptible external circuit that allows an electric current to pass between the negative and positive electrodes. Examples of the negative electrode active material for either a lithium-sulfur battery or a lithium ion battery include silicon or silicon alloys. When the lithium-sulfur battery includes silicon or a silicon alloy as the active material, the battery may be referred to as a silicon-sulfur battery or a silicon(lithium) sulfur battery.

Silicon or a silicon alloy may be a desirable material for the negative electrode of a lithium-sulfur or lithium ion battery, at least in part because of its high theoretical capacity (e.g., 4200 mAh/g). Moreover, a solid electrolyte interphase (SEI) layer may form on exposed surface(s) of the silicon-based negative electrode, and this layer can desirably affect the cell performance. Generally, the SEI layer forms from i) electrolyte components decomposing when exposed to low voltage potential, and ii) the electrolyte decomposition products depositing on the exposed surfaces of the silicon-based negative electrode. It is desirable that the SEI layer be formed in a controlled environment so that an electronically insulating layer with a desirable thickness is obtained. In theory, the SEI covers the negative electrode surface and blocks electrons from diffusing out of the negative electrode, which would otherwise inevitably consume the electrolyte by electrochemical reduction. Furthermore, the SEI layer can impart kinetic stability to the electrolyte against further reductions in subsequent cycles. The SEI is also typically ionically conducting and thus allows Li-ions to travel across the layer. Overall, the SEI should contribute to good cycling of the battery.

While silicon and silicon alloy(s) have high theoretical capacity advantages, the use of silicon or the silicon alloy may also result in the battery having a poor life cycle. For example, silicon and silicon alloy(s) may exhibit large volume expansion and contraction during charging/discharging of the battery. Extreme volume expansion and contraction can cause the negative electrode material to fracture, decrepitate, or otherwise mechanically degrade, which results in a loss of electrical contact and poor life cycling. Additionally, the extreme volume expansion and contraction of the silicon or silicon alloy can also damage unstable SEI layer(s) and expose portions of the underlying silicon/silicon alloy to additional electrolyte. This can cause further decomposition of the electrolyte at the exposed portions, resulting in the formation of additional SEI layer(s). Continuous breaking and formation of the SEI layer can irreversibly trap lithium in the SEI layer, can consume the electrolyte, and/or can undesirably thicken the SEI layer.

An example of the electrolyte disclosed herein may be used to pre-lithiate a silicon-based negative electrode and to form a stable SEI layer on a surface thereof. By "stable", it is meant that the formed SEI layer is relatively resistant to decomposition when exposed to migrating, diffusing, or shuttling lithium-polysulfide intermediates (LiS$_x$, where x is 2<x<8) from the sulfur-based positive electrode during the silicon-sulfur battery discharge process. Lithium-polysulfide intermediates generated at the sulfur-based positive electrode are generally soluble in the battery electrolyte, and can migrate to the silicon-based negative electrode where they react with the negative electrode in a parasitic fashion to generate lower-order lithium-polysulfide intermediates. These lithium-polysulfide intermediates diffuse back to the positive electrode and regenerate the higher forms of lithium-polysulfide intermediates. As a result, a shuttle effect takes place in the battery. Furthermore, these polysulfide intermediate anions are a strong Lewis base due to their electron rich characteristic, and thus will attack chemicals having electron withdrawing group(s), such as carbonyl groups. However, the stable SEI layer disclosed herein, which is formed using the pre-litiation electrolyte disclosed herein, remains intact when exposed to lithium-polysulfide intermediates, and thus consumes less of the electrolyte and acts as a barrier layer that keeps the lithium-polysulfide intermediates from reaching the silicon-based negative electrode. Additionally, it is believed that the stable SEI layer is more tolerant of the silicon or silicon alloy volume expansion. Overall the use of the pre-lithiation electrolyte disclosed herein can contribute to an improved battery life cycle.

Another example of the electrolyte disclosed herein may be used during the cycling of the silicon-sulfur battery. This electrolyte includes additive(s) that can further contribute to the stability of the SEI layer during battery operation.

As noted above, one of the electrolytes disclosed herein is a pre-lithiation electrolyte that is used to pre-lithiate an example of the silicon-based negative electrode (reference numeral 12 in FIG. 1) and to form an SEI layer (reference numeral 19 in FIG. 1 and FIG. 2) on exposed surface(s) of the silicon-based negative electrode 12. The pre-lithiation electrolyte solution disclosed herein may be included in a pre-lithiation kit with the silicon-based negative electrode 12. As will be described in further detail below, pre-lithiation adds active Li$^+$ into the silicon-based negative electrode 12, and renders it suitable for use in a lithium based battery.

Figure 1:
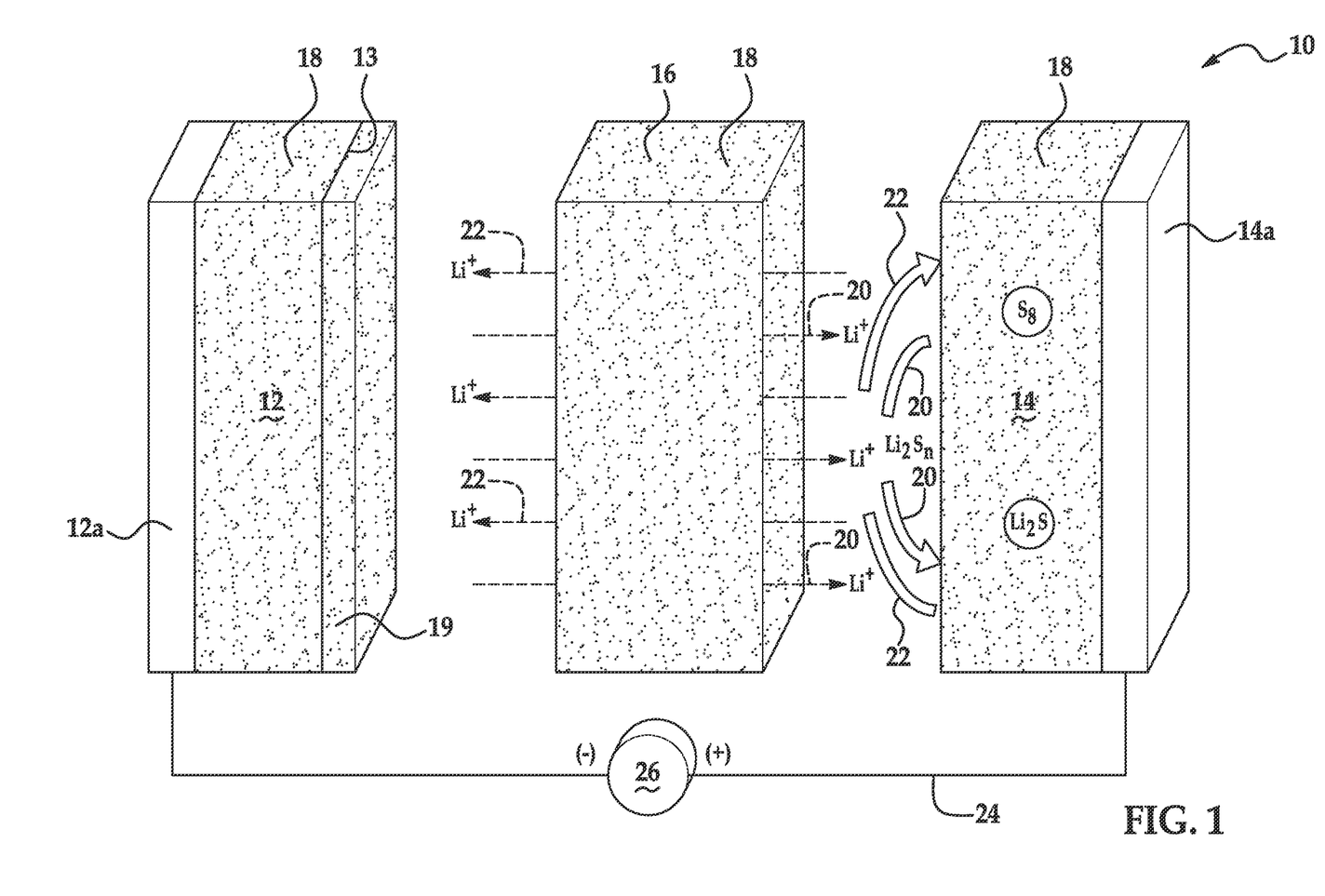
FIG. 1 is a schematic, perspective view of an example of a silicon-sulfur battery showing a charging and discharging state, the battery including an electrolyte according to an example of the present disclosure.

The pre-lithiation electrolyte and the process for forming and pre-lithiating the silicon-based negative electrode 12 will now be described. FIG. 1 will be referenced throughout the discussion.

The pre-lithiation electrolyte includes a lithium salt. As examples, the lithium salt may be LiPF$_6$, LiAlCl$_4$, LiI, LiBr, LiSCN, LiB(C$_6$H$_5$)$_4$, LiAsF$_6$, LiCF$_3$SO$_3$, LiPF$_4$(C$_2$O$_4$) (LiFOP), LiNO$_3$, LiBF$_4$, LiClO$_4$, LiN(CF$_3$SO$_2$)$_2$ (LiTFSI), LiB(C$_2$O$_4$)$_2$ (LiBOB), LiBF$_2$(C$_2$O$_4$) (LiODFB), LiN(FSO$_2$)$_2$ (LiFSI), LiPF$_3$(C$_2$F$_5$)$_3$ (LiFAP), LiPF$_4$(CF$_3$)$_2$, LiPF$_3$(CF$_3$)$_3$, etc. In an example, the lithium salt in the pre-lithiation electrolyte is 1M LiPF$_6$.

The lithium salt is dissolved in a solvent mixture of dimethoxyethane (DME) and fluoroethylene carbonate (FEC). The volume to volume ratio of the solvents (DME to FEC) ranges from 10 to 1 to 1 to 10. In an example, the volume to volume ratio of DME to FEC is 3 to 1. It has been found that using FEC as a co-solvent forms the desirable SEI layer 19 on the exposed surface(s) of the silicon-based negative electrode 12 during the pre-lithiation process. The FEC is active and readily decomposes during pre-lithiation to form the SEI layer 19.

Prior to pre-lithiating the silicon-based negative electrode 12, the electrode 12 is purchased or fabricated. In an example, fabrication of the electrode 12 involves dispersing the silicon or silicon alloy, a conducting carbon, and a binder at a certain ratio into an organic solvent or water. The dispersion may be mixed to obtain a homogeneous solution. The solution may then be doctor blade coated (or otherwise deposited) onto a copper or other suitable negative-side current collector.

The silicon-based negative electrode 12 includes any silicon-based lithium host material (i.e., active material) that can sufficiently undergo lithium alloying and intercalating with copper, or another suitable current collector, functioning as the negative terminal 12a. Examples of the silicon active material include crystalline silicon, amorphous silicon, silicon oxide (SiO$_x$), silicon alloys (e.g., Si—Sn), etc. The silicon active material may be in the form of a powder, particles, etc. ranging from nano-size to micro-size.

The silicon-based negative electrode 12 may also include the previously mentioned polymer binder material to structurally hold the silicon active material together. Example binders include polyvinylidene fluoride (PVdF), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, poly(acrylamide-co-diallyl dimethyl ammonium chloride), polyethylene oxide (PEO), or polyimide (PI). Other suitable binders include polyvinyl alcohol (PVA), sodium alginate, or other water-soluble binders.

Still further, the silicon-based negative electrode 12 may also include the previously mentioned conductive carbon material. The conductive carbon may be a high surface area carbon, such as acetylene black (i.e., carbon black), and is included to ensure electron conduction between the silicon active material and, for example, a negative-side current collector (reference numeral 12a in FIG. 1). Other examples of suitable conductive fillers, which may be used alone or in combination with carbon black, include graphene, graphite, carbon nanotubes, and/or carbon nanofibers. One specific example of a combination of conductive fillers is carbon black and carbon nanofibers.

The silicon-based negative electrode 12 may include about 40% by weight to about 90% by weight (i.e., 90 wt %) of the silicon active material. The negative electrode 12 may include from 0% by weight to about 30% by weight of the conductive filler. Additionally, the negative electrode 12 may include 0% by weight to about 20% by weight of the polymer binder. In an example, the silicon-based negative electrode 12 includes about 70 wt % of the silicon active material, about 15 wt % of the conductive carbon material, and about 15 wt % of the polymer binder material. As briefly described above, the solution formed from a dispersion of these materials may be made and cast onto the negative-side current collector (e.g., copper) and dried to form the silicon-based negative electrode 12.

The silicon-based negative electrode 12 may then be pre-lithiated using a lithium-silicon half cell method. More specifically, the Li—Si half cell is assembled using the silicon-based negative electrode 12, which is soaked in the pre-lithiation electrolyte previously described. A voltage potential is applied to the half cell, which causes the FEC in the pre-lithiation electrode to decompose. The decomposition product deposits on the exposed surface(s) 13 of the silicon-based negative electrode 12 to form the SEI layer 19. The decomposition product may be LiF, Li$_2$CO$_3$, Li$_x$PF$_y$O$_z$, F-replaced Lithium Ethylene Di Carbonate (F-LEDC), an unsaturated polyolefin, etc. The voltage potential is applied for a time sufficient to form the SEI layer 19. The time that the voltage potential is applied may range from about 1 hour to about 100 hours. In an example, the voltage potential is applied for about 20 hours. In an example, when a higher current is used, the exposure time may be shorter. Similarly, when a lower current is used, the exposure time may be longer. The SEI layer 19 may have a thickness of about 10 nm or less.

In another example, the silicon-based negative electrode 12 may be pre-lithiated by short circuiting lithium-silicon having the previously described pre-lithiation electrolyte positioned therebetween. This may be accomplished for a time period ranging from about 1 hour to about 24 hours.

During pre-lithiation, lithium ions are dissolved (or de-plated or stripped) from lithium metal of the Li—Si half cell and are alloyed with silicon by an electrochemical reaction with the pre-lithiation electrolyte (which can conduct the lithium ions). The lithium ions can alloy with the silicon-based active material, thereby lithiating the silicon-based negative electrode 12.

Figure 2:
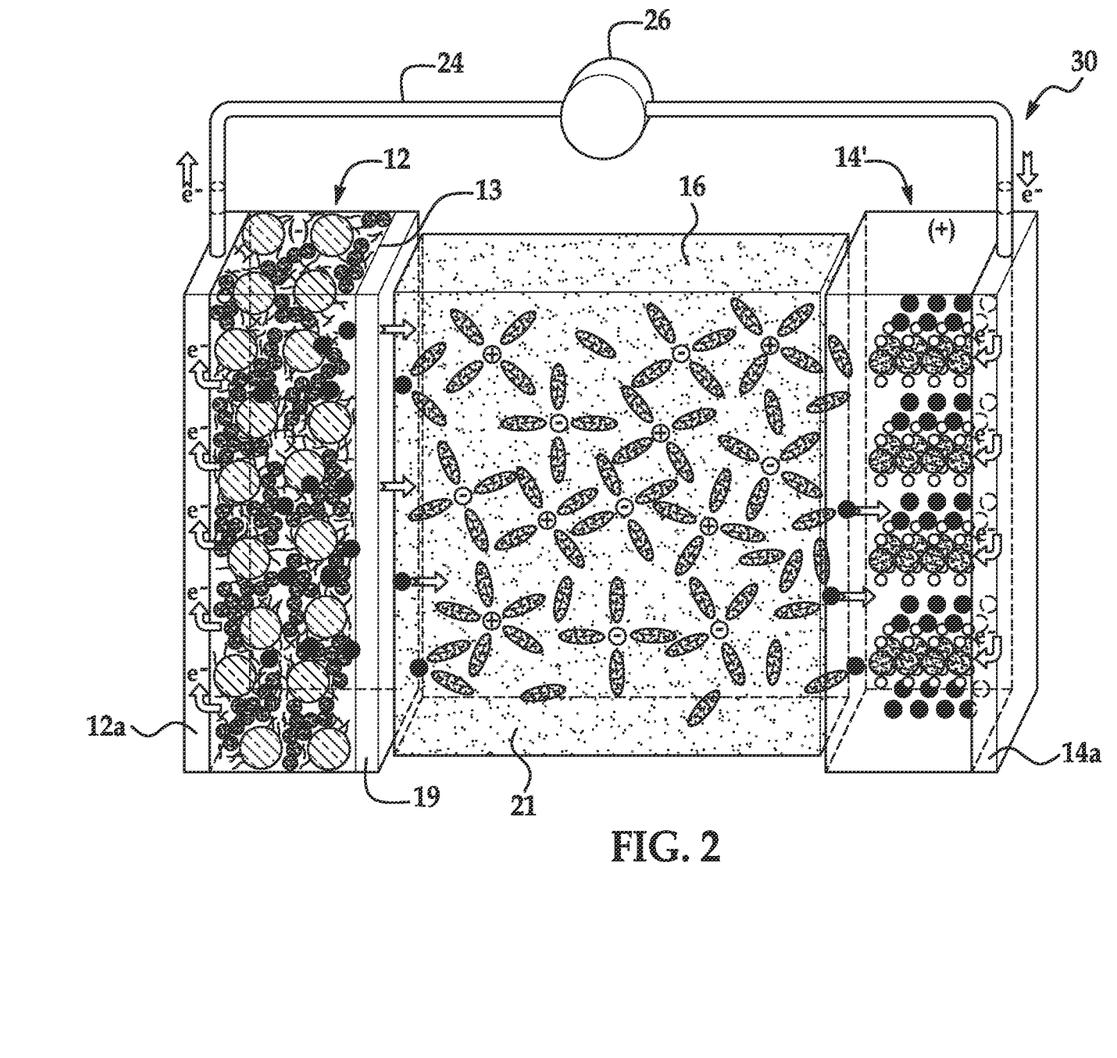
FIG. 2 is a schematic, perspective view of an example of a lithium ion battery showing a discharging state, the battery including an example of the pre-lithiated negative electrode disclosed herein.

When pre-lithiation is complete, the lithiated silicon-based negative electrode 12 having the SEI layer 19 formed thereon may be rinsed to remove any remaining pre-lithiation electrolyte, and then may be used in either a lithium ion battery 30 or a silicon-sulfur battery 10.

When used in a lithium-sulfur battery or a silicon-sulfur battery 10, the lithiated silicon-based negative electrode 12 disclosed herein may be paired with a positive electrode 14 formed from any sulfur-based active material that can sufficiently undergo lithium alloying and dealloying with aluminum, or another suitable current collector, functioning as the positive terminal of the battery 10. In an example, the sulfur based active material may be a sulfur-carbon composite. In an example, the weight ratio of S to C in the positive electrode 14 ranges from 1:9 to 8:1.

The positive electrode 14 may also include a polymer binder material to structurally hold the sulfur-based active material together. The polymer binder material may be made of at least one of polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, or polyvinyl alcohol (PVA), sodium alginate, or other water-soluble binders.

Still further, the positive electrode 14 may include a conductive carbon material. In an example, the conductive carbon material is a high surface area carbon, such as acetylene black (i.e., carbon black) or activated carbon. Other examples of suitable conductive fillers, which may be used alone or in combination with carbon black, include graphene, graphite, carbon nanotubes, and/or carbon nanofibers. One specific example of a combination of conductive fillers is carbon black and carbon nanofibers.

The positive electrode 14 may include about 40% by weight to about 90% by weight (i.e., 90 wt %) of the sulfur-based active material. The positive electrode 14 may include 0% by weight to about 30% by weight of the conductive filler. Additionally, the positive electrode 14 may include 0% by weight to about 20% by weight of the polymer binder. In an example, the positive electrode 14 includes about 80 wt % of the sulfur-based active material, about 10 wt % of the conductive carbon material, and about 10 wt % of the polymer binder material.

The silicon-sulfur battery 10 will now be discussed in more detail. As shown in FIG. 1, the silicon-sulfur battery 10 includes the positive-side current collector 14a and the previously mentioned negative-side current collector 12a positioned in contact with the positive electrode 14 and the silicon-based negative electrode 12, respectively, to collect and move free electrons to and from an external circuit 24. The positive-side current collector 14a may be formed from aluminum or any other appropriate electrically conductive material. The negative-side current collector 12a may be formed from copper or any other appropriate electrically conductive material.

It is to be understood that the silicon-sulfur battery 10 may include the pre-lithiated silicon-based negative electrode 12 having the SEI layer 19 formed thereon.

Also, as shown in FIG. 1, the silicon-sulfur battery 10 includes the pre-lithiated silicon-based negative electrode 12 (having the SEI layer 19 formed thereon) and the sulfur-based positive electrode 14 separated by a porous separator 16.

The porous separator 16 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous separators 16 include single layer polypropylene membranes, such as CELGARD 2400 and CELGARD 2500 from Celgard, LLC (Charlotte, N.C.). It is to be understood that the porous separator 16 may be coated or treated, or uncoated or untreated. For example, the porous separator 16 may or may not be coated or include any surfactant treatment thereon.

In other examples, the porous separator 16 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous separator 16 is poly(p-hydroxybenzoic acid). In yet another example, the porous separator 16 may be chosen from a combination of the polyolefin (such as PE and/or PP) and one or more of the other polymers listed above.

The porous separator 16 may be a single layer or may be a multi-layer (e.g., bilayer, trilayer, etc.) laminate fabricated from either a dry or wet process. For example, a single layer of the polyolefin and/or other listed polymer may constitute the entirety of the separator 16. As another example, however, multiple discrete layers of similar or dissimilar polyolefins and/or polymers may be assembled into the separator 16. In one example, a discrete layer of one or more of the polymers may be coated on a discrete layer of the polyolefin to form the separator 16. Further, the polyolefin (and/or other polymer) layer, and any other optional polymer layers, may further be included in the separator 16 as a fibrous layer to help provide the separator with appropriate structural and porosity characteristics. Still other suitable separators 16 include those that have a ceramic layer attached thereto, and those that have ceramic filler in the polymer matrix (i.e., an organic-inorganic composite matrix). In still other instances, a ceramic membrane, such as $Al_2O_3$, $Si_3N_4$, and SiC, itself may be used as the separator 16.

The porous separator 16 operates as an electrical insulator (preventing the occurrence of a short), a mechanical support, and a barrier to prevent physical contact between the two electrodes 12, 14. The porous separator 16 also ensures passage of lithium ions (identified by the $Li^+$) through an electrolyte 18 filling its pores.

As shown in FIG. 1, each of the silicon-based negative electrode 12 (including the SEI layer 19), the positive electrode 14, and the porous separator 16 are soaked in the battery electrolyte 18. In the examples disclosed herein, the battery electrolyte 18 (not to be confused with the previously described pre-lithiation electrolyte) consists of lithium bis (trifluoromethylsulfonyl)imide (LiTFSI) and/or $LiPF_6$, a solvent mixture of dimethoxyethane (DME) and 1,3-dioxolane (DIOX), a lithium salt additive selected from the group consisting of $LiBF_2(C_2O_4)$ (LiODFB), $LiPF_6$, and/or $LiB(C_2O_4)_2$, and optionally $LiNO_3$.

The lithium salt additive is included in a small amount, ranging from about 0.1 wt % to about 10 wt % of a total wt % of the electrolyte solution. It is believed that the small amount of the lithium salt additive disclosed herein can effectively increase the battery cycling performance and Coulombic efficiency. The lithium salt additive may contribute to the formation of a stable SEI layer 19.

It is to be understood that when $LiPF_6$ is present in the battery electrolyte 18, the electrolyte solution also consists of a Lewis base to stabilize the $LiPF_6$. Examples of suitable Lewis bases include dimethylacetamide (DMAc) and tributylamine (TBA). The Lewis base may be present in an amount ranging from about 0.1 wt % and about 5 wt %.

The battery electrolyte 18 disclosed herein enhances the performance of the silicon-sulfur full cell. One specific example of the battery electrolyte 18 includes from about 0.1 M to about 0.5 M $LiNO_3$ plus from about 0.1 M to about 1 M LiTFSI and from about 0.1 M to about 1 M $LiPF_6$ in dimethoxyethane (DME):1,3-dioxolane (DIOX) (v:v=10:1 to 1:10), and from about 0.1 M to about 0.5 M LiODFB as a lithium salt additive. This example battery electrolyte 18 may or may not include a trace amount (from about 0.1 wt % to about 3 wt %) DMAc or TBA as a $PF_5$ scavenger. This electrolyte system can effectively improve the columbic efficiency of a prepared silicon-sulfur full cell, although it is believed that the low Coulombic efficiency for silicon-sulfur full cell may be further enhanced.

The silicon-sulfur battery 10 also includes the interruptible external circuit 24 that connects the positive electrode 14 and the negative electrode 12. The silicon-sulfur battery 10 may also support a load device 26 that can be operatively connected to the external circuit 24. The load device 26 receives a feed of electrical energy from the electric current passing through the external circuit 24 when the silicon-sulfur battery 10 is discharging. While the load device 26 may be any number of known electrically-powered devices, a few specific examples of a power-consuming load device include an electric motor for a hybrid vehicle or an all-electrical vehicle, a laptop computer, a cellular phone, and a cordless power tool. The load device 26 may also, however, be a power-generating apparatus that charges the silicon-sulfur battery 10 for purposes of storing energy. For instance, the tendency of windmills and solar panels to variably and/or intermittently generate electricity often results in a need to store surplus energy for later use.

The silicon-sulfur battery 10 can include a wide range of other components that, while not depicted here, are nonetheless known to skilled artisans. For instance, the silicon-sulfur battery 10 may include a casing, gaskets, terminals, tabs, and any other desirable components or materials that may be situated between or around the positive electrode 14 and the silicon-based negative electrode 12 for performance-related or other practical purposes. Moreover, the size and shape of the silicon-sulfur battery 10, as well as the design and chemical make-up of its main components, may vary depending on the particular application for which it is designed. Battery-powered automobiles and hand-held consumer electronic devices, for example, are two instances where the silicon-sulfur battery 10 would most likely be designed to different size, capacity, and power-output specifications. The silicon-sulfur battery 10 may also be connected in series and/or in parallel with other similar silicon-sulfur batteries 10 to produce a greater voltage output and current (if arranged in parallel) or voltage (if arranged in series) if the load device 26 so requires.

The silicon-sulfur battery 10 can generate a useful electric current during battery discharge (shown by reference numeral 20 in FIG. 1). During discharge, the chemical processes in the battery 10 include lithium ($Li^+$) dissolution from the negative electrode 12 and incorporation of the lithium cations into alkali metal polysulfide salts (i.e., $Li_2S_n$, such as $Li_2S_8$, $Li_2S_6$, $Li_2S_4$, $Li_2S_2$, and $Li_2S$) in the positive electrode 14. As such, polysulfides are formed (sulfur is reduced) within the positive electrode 14 in sequence while the battery 10 is discharging. The chemical potential difference between the positive electrode 14 and the negative electrode 12 (ranging from approximately 1.5 to 3.0 volts, depending on the exact chemical make-up of the electrodes 12, 14) drives electrons produced by the dissolution of lithium at the negative electrode 12 through the external circuit 24 towards the positive electrode 14. The resulting electric current passing through the external circuit 24 can be harnessed and directed through the load device 26 until the lithium in the negative electrode 12 is depleted and the capacity of the silicon-sulfur battery 10 is diminished.

The silicon-sulfur battery 10 can be charged or re-powered at any time by applying an external power source to the silicon-sulfur battery 10 to reverse the electrochemical reactions that occur during battery discharge. During charging (shown at reference numeral 22 in FIG. 1), lithium alloying to the negative electrode 12 takes place and sulfur formation within the positive electrode 14 takes place. The connection of an external power source to the silicon-sulfur battery 10 compels the otherwise non-spontaneous oxidation of lithium at the positive electrode 14 to produce electrons and lithium ions. The electrons, which flow back towards the negative electrode 12 through the external circuit 24, and the lithium ions ($Li^+$), which are carried by the electrolyte 18 across the separator 16 back towards the negative electrode 12, reunite at the negative electrode 12 and replenish it with lithium for consumption during the next battery discharge cycle 20. The external power source that may be used to charge the silicon-sulfur battery 10 may vary depending on the size, construction, and particular end-use of the silicon-sulfur battery 10. Some suitable external power sources include a battery charger plugged into an AC wall outlet and a motor vehicle alternator.

Referring now to FIG. 2, when the pre-lithiated silicon-based negative electrode 12 herein is used in a lithium ion battery 30, any known separator 16, current collector(s), etc. may be used with the pre-lithiated silicon-based negative electrode 12 and an appropriate positive electrode 14'. It is to be understood that the porous separator 16 used in the lithium ion battery 30 may be the same type of porous separator 16 that is described in FIG. 1 for the silicon-sulfur battery 10. In addition, the negative-side current collector 12a and positive-side current collector 14a described herein for the silicon-sulfur battery 10 may also be used in the lithium ion battery 30.

It is to be understood that the lithium ion battery 30 may include the pre-lithiated silicon-based negative electrode 12 having the SEI layer 19 formed thereon.

In FIG. 2, the lithiated silicon-based negative electrode 12 disclosed herein may be paired with the positive electrode 14', which is formed from any lithium based active material that can sufficiently undergo lithium insertion and deinsertion while functioning as the positive terminal of the lithium ion battery 30. One common class of known lithium based active materials suitable for the positive electrode 14' includes layered lithium transitional metal oxides. Some specific examples of the lithium based active materials include spinel lithium manganese oxide ($LiMn_2O_4$), lithium cobalt oxide ($LiCoO_2$), a nickel-manganese oxide spinel [$Li(Ni_{0.5}Mn1.5)O_2$], a layered nickel manganese cobalt oxide [$Li(Ni_xMn_yCo_z)O_2$], or a lithium iron polyanion oxide, such as lithium iron phosphate ($LiFePO_4$) or lithium iron fluorophosphate ($Li_2FePO_4F$). Other lithium based active materials may also be utilized, such as lithium nickel-cobalt oxide ($LiNi_xCo_{1-x}O2$), aluminum stabilized lithium manganese oxide spinel ($Li_xMn_{2-x}Al_yO_4$), and lithium vanadium oxide ($LiV_2O_5$). $Li_2MSiO_4$ (M is composed of any ratio of Co, Fe, and/or Mn), $xLi_2MnO_3$-$(1-x)LiMO_2$ (M is composed of any ratio of Ni, Mn and/or Co), and any other high efficiency nickel-manganese-cobalt material. By "any ratio" it is meant that any element may be present in any amount. So, for example M could be Al, with or without Co and/or Mg, or any other combination of the listed elements.

The lithium-based active material of the positive electrode 14' may be intermingled with a polymeric binder and a conductive filler (e.g., high surface area carbon). Any of the binders previously described for the negative electrode 12 may be used in the positive electrode 14'. The polymeric binder structurally holds the lithium-based active materials and the high surface area carbon together. An example of the high surface area carbon is acetylene black. The high surface area carbon ensures electron conduction between the positive-side current collector 14a and the active material particles of the positive electrode 14'.

The porous separator 16 in FIG. 2, which operates as both an electrical insulator and a mechanical support, is sandwiched between the negative electrode 12 and the positive electrode 14' to prevent physical contact between the two electrodes 12, 14' and to prevent the occurrence of a short circuit. In addition to providing a physical barrier between the two electrodes 12, 14', the porous separator 16 ensures passage of lithium ions (identified by the black dots and by the open circles having a (+) charge in FIG. 2) and related anions (identified by the open circles having a (−) charge in FIG. 2) through an electrolyte solution filling its pores. This helps ensure that the lithium ion battery 30 functions properly.

Any appropriate electrolyte solution 21 that can conduct lithium ions between the negative electrode 12 and the positive electrode 14' may be used in the lithium ion battery 30. In one example, the electrolyte solution 21 may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 30 as well as how to manufacture or commercially acquire them. Some examples of the lithium salts that may be used are $LiClO_4$, $LiAlCl_4$, LiI, LiBr, $LiB(C_2O_4)_2$ (LiBOB), $LiBF_2(C_2O_4)$ (LiODFB), LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI), $LiPF_6$, $LiPF_4(C_2O_4)$ (LiFOP), $LiNO_3$, and mixtures thereof. The organic solvents may be cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran,1,3-dioxolane), and mixtures thereof.

As shown in FIG. 2, the lithium ion battery 30 also includes an interruptible external circuit 24 that connects the negative electrode 12 and the positive electrode 14'. The lithium ion battery 30 may also support a load device 26 that can be operatively connected to the external circuit 24. The load device 26 receives a feed of electrical energy from the electric current passing through the external circuit 24 when the lithium ion battery 30 is discharging. While the load device 26 may be any number of known electrically-powered devices, a few specific examples of a power-consuming load device 26 include an electric motor for a hybrid vehicle or an all-electrical vehicle, a laptop computer, a cellular phone, and a cordless power tool. The load device 26 may also, however, be an electrical power-generating apparatus that charges the lithium ion battery 30 for purposes of storing energy. For instance, the tendency of windmills and solar panels to variably and/or intermittently generate electricity often results in a need to store surplus energy for later use.

The lithium ion battery 30 may also include a wide range of other components that, while not depicted here, are nonetheless known to skilled artisans. For instance, the lithium ion battery 30 may include a casing, gaskets, terminals, tabs, and any other desirable components or materials that may be situated between or around the negative electrode 12 and the positive electrode 14' for performance-related or other practical purposes. Moreover, the size and shape of the lithium ion battery 30, as well as the design and chemical make-up of its main components, may vary depending on the particular application for which it is designed. Battery-powered automobiles and hand-held consumer electronic devices, for example, are two instances where the lithium ion battery 30 would most likely be designed to different size, capacity, and power-output specifications. The lithium ion battery 30 may also be connected in series and/or in parallel with other similar lithium ion batteries to produce a greater voltage output and current (if arranged in parallel) or voltage (if arranged in series) if the load device 26 so requires.

The lithium ion battery 30 generally operates by reversibly passing lithium ions between the negative electrode 12 and the positive electrode 14'. In the fully charged state, the voltage of the battery 30 is at a maximum (typically in the range 2.0V to 5.0V); while in the fully discharged state, the voltage of the battery 30 is at a minimum (typically in the range 0V to 2.0V). Essentially, the Fermi energy levels of the active materials in the positive and negative electrodes 14', 12 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 26 enables an electronic current flow in the external circuit 24 with a direction such that the difference between the Fermi levels (and, correspondingly, the cell voltage) decreases. The reverse happens during battery charging: the battery charger forces an electronic current flow in the external circuit 24 with a direction such that the difference between the Fermi levels (and, correspondingly, the cell voltage) increases.

At the beginning of a discharge, the negative electrode 12 of the lithium ion battery 30 contains a high concentration of intercalated lithium while the positive electrode 14' is relatively depleted. When the negative electrode 12 contains a sufficiently higher relative quantity of intercalated lithium, the lithium ion battery 30 can generate a beneficial electric current by way of reversible electrochemical reactions that occur when the external circuit 24 is closed to connect the negative electrode 12 and the positive electrode 14'. The establishment of the closed external circuit under such circumstances causes the extraction of intercalated lithium from the negative electrode 12. The extracted lithium atoms are split into lithium ions (identified by the black dots and by the open circles having a (+) charge) and electrons (e$^-$) as they leave an intercalation host at the negative electrode-electrolyte interface.

The chemical potential difference between the positive electrode 14' and the negative electrode 12 (ranging from about 2.0V to about 5.0V, depending on the exact chemical make-up of the electrodes 12, 14') drives the electrons (e$^-$) produced by the oxidation of intercalated lithium at the negative electrode 12 through the external circuit 24 towards the positive electrode 14'. The lithium ions are concurrently carried by the electrolyte solution through the porous separator 16 towards the positive electrode 14'. The electrons (e$^-$) flowing through the external circuit 24 and the lithium ions migrating across the porous separator 16 in the electrolyte solution eventually reconcile and form intercalated lithium at the positive electrode 14'. The electric current passing through the external circuit 24 can be harnessed and directed through the load device 26 until the level of intercalated lithium in the negative electrode 12 falls below a workable level or the need for electrical energy ceases.

The lithium ion battery 30 may be recharged after a partial or full discharge of its available capacity. To charge the lithium ion battery 30 an external battery charger is connected to the positive and the negative electrodes 14', 12, to drive the reverse of battery discharge electrochemical reactions. During recharging, the electrons (e$^-$) flow back towards the negative electrode 12 through the external circuit 24, and the lithium ions are carried by the electrolyte across the porous separator 16 back towards the negative electrode 12. The electrons (e$^-$) and the lithium ions are reunited at the negative electrode 12, thus replenishing it with intercalated lithium for consumption during the next battery discharge cycle.

The external battery charger that may be used to charge the lithium ion battery 30 may vary depending on the size, construction, and particular end-use of the lithium ion battery 30. Some suitable external battery chargers include a battery charger plugged into an AC wall outlet and a motor vehicle alternator.

Examples of the batteries 10, 30 may be used in a variety of different applications. For example, the batteries 10, 30 may be used in different devices, such as a battery operated or hybrid vehicle, a laptop computer, a cellular phone, a cordless power tool, or the like.

To further illustrate the present disclosure, examples are given herein. It is to be understood that these examples are provided for illustrative purposes and are not to be construed as limiting the scope of the disclosed example(s).

Example 1

A silicon-based negative electrode was prepared and pre-lithiated. The silicon-based negative electrode included 70% of silicon or a silicon alloy, 15% of a conductive carbon material, and 15% of a binder. The silicon-based negative electrode was pre-lithiated in a half-cell using a pre-lithiation electrolyte of 1M LiPF$_6$ in DME:FEC (v:v=3:1). The half-cell was discharged to 10 my vs. Li/Li$^+$ in 10 to 48 hours.

After pre-lithiation, the silicon-based negative electrode was rinsed with DME and incorporated into an example full silicon-sulfur battery. The example full silicon-sulfur battery included a sulfur-based positive electrode and a separator. The sulfur cathode was composed of 80% element sulfur, 10% conductive carbon material, and 10% binder. Polypropylene (PP2500) was used as the separator. The battery electrolyte used in the example full silicon-sulfur battery was 0.3 M LiNO$_3$ plus 0.7 M LiTFSI in dimethoxyethane (DME):1,3-dioxolane (DIOX) (v:v=1:1).

A comparative full silicon-sulfur battery was also prepared. The comparative full silicon-sulfur battery included a comparative silicon-based negative electrode that had been pre-lithiated with a comparative pre-lithiation electrolyte of 1M LiTFSI in DME:DIOX (v:v=1:1) plus 5% FEC. The pre-lithiation of the comparative silicon-based negative electrode was performed in a similar manner as described for the example silicon-based negative electrode.

The comparative full silicon-sulfur battery included the same type of sulfur-based positive electrode, separator, and battery electrolyte (i.e., 0.3 M LiNO$_3$ plus 0.7 M LiTFSI in DME:DIOX (v:v=1:1)) previously described for the example full silicon-sulfur battery.

The galvanostatic cycling performance of the example full silicon-sulfur battery (1) and the comparative full silicon-sulfur battery (2) was tested by cycling between 1.3V and 2.6V at a rate of C/10 at room temperature for up to 40 cycles.

Figure 3:
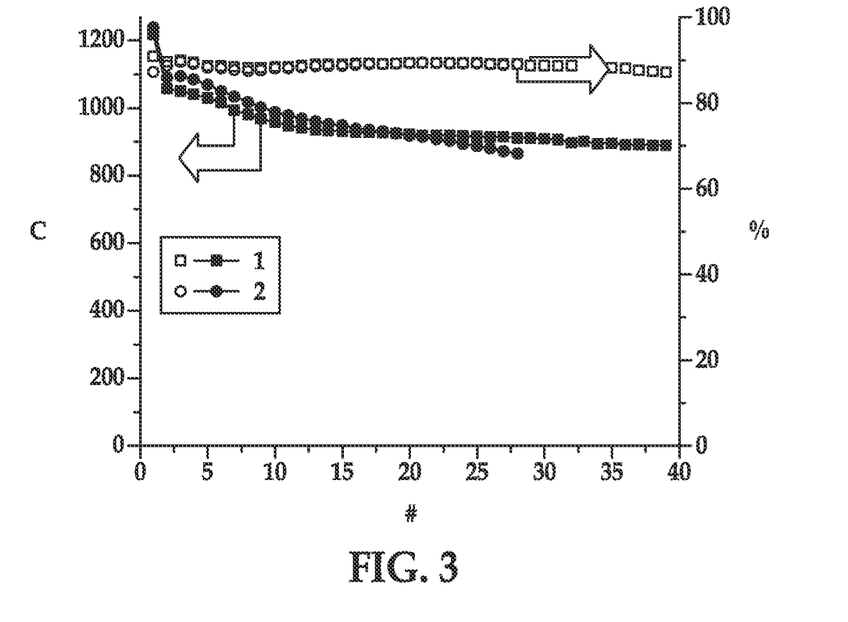
FIG. 3 is a graph illustrating the capacity (mAh/$g_s$, left Y-axis labeled "C") vs. cycle number (X-axis labeled "#") and the Coulombic efficiency (%, right Y-axis labeled "%") vs. cycle number (X-axis labeled "#") for an example silicon-sulfur battery with an example of a pre-lithiated negative electrode disclosed herein, and a comparative example silicon-sulfur battery with a comparative pre-lithiated negative electrode.

The cycling performance and Coulombic efficiency results are shown in FIG. 3. In particular, the capacity (mAh/g$_s$) is shown on the left Y-axis (labeled "C"), the Coulombic efficiency (%) is shown on the right Y-axis (labeled "%"), and the cycle number is shown on the X-axis (labeled "#"). As noted above, "1" represents the results for the example full silicon-sulfur battery, and "2" represents the results for the comparative full silicon-sulfur battery. Overall, the example full silicon-sulfur battery, including the negative electrode pre-lithiated with 1M LiPF$_6$ in DME:FEC (v:v=3:1), exhibited more stable performance. It is believed that this is due to the SEI layer that is formed during the pre-lithiation process.

Example 2

An example full silicon-sulfur battery was prepared with a pre-lithiated silicon-based negative electrode, a sulfur-based positive electrode, and a separator, as previously described in Example 1. The battery electrolyte used in this example full silicon-sulfur battery was 0.3 M $LiNO_3$ plus 0.5 M LiTFSI and 0.2 M $LiPF_6$ in dimethoxyethane (DME):1,3-dioxolane (DIOX) (v:v=1:1), and about 0.1 M LiODFB as a lithium salt additive.

A comparative full silicon-sulfur battery was also prepared. The comparative full silicon-sulfur battery included the same type of pre-lithiated silicon-based negative electrode, sulfur-based positive electrode, and separator as the example full silicon-sulfur battery. The comparative battery electrolyte used in this example of the comparative full silicon-sulfur battery was 0.3 M $LiNO_3$ plus 0.7 M LiTFSI in dimethoxyethane (DME):1,3-dioxolane (DIOX) (v:v=1:1). No lithium salt additive was included.

The galvanostatic cycling performance of the example full silicon-sulfur battery (3) and the comparative full silicon-sulfur battery (4) was tested by cycling between 1.3V and 2.6V at a rate of C/10 at room temperature for up to 90 cycles.

Figure 4:
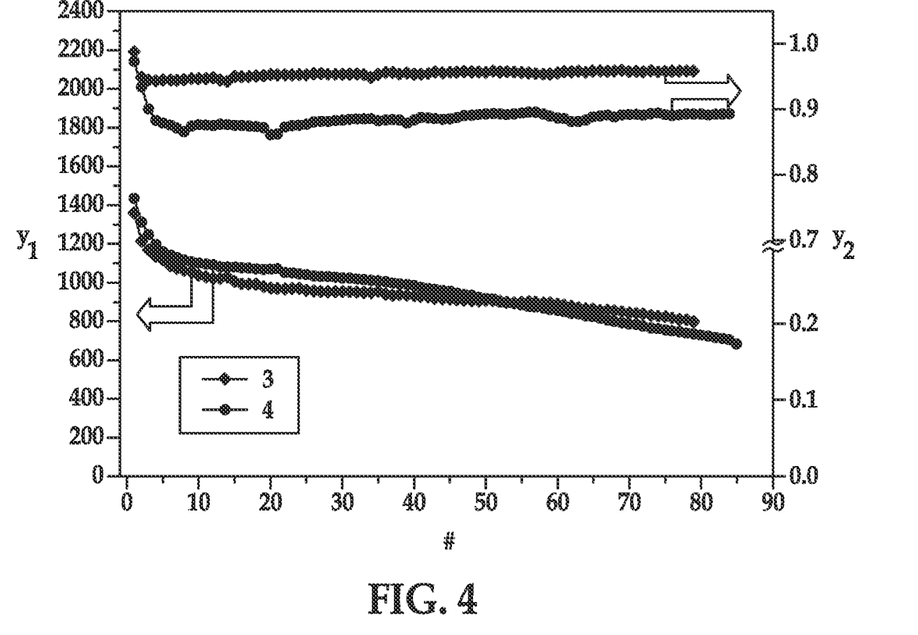
FIG. 4 is a graph illustrating the specific capacity based on sulfur (mAh/g, left Y-axis labeled "$Y_1$") vs. cycle number (X-axis labeled "#") and the Coulombic efficiency (right Y-axis labeled "$Y_2$") vs. cycle number (X-axis labeled "#") for an example silicon-sulfur battery with an example of an electrolyte including a lithium salt additive as disclosed herein, and a comparative example silicon-sulfur battery with an unmodified electrolyte (i.e., no lithium salt additive).

The cycling performance and Coulombic efficiency results are shown in FIG. 4. In particular, the specific capacity based on sulfur (mAh/g) is shown on the left Y-axis (labeled "$y_1$"), the Coulombic efficiency (%) is shown on the right Y-axis (labeled "$y_2$"), and the cycle number is shown on the X-axis (labeled "#"). As noted above, "3" represents the results for the example full silicon-sulfur battery tested with the electrolyte including the lithium salt additive, and "4" represents the results for the comparative full silicon-sulfur battery tested with the electrolyte excluding the lithium salt additive. Overall, the example full silicon-sulfur battery, with the electrolyte including the lithium salt additive, exhibited increased cycling performance (e.g., see results at 50 cycles and beyond) and Coulombic efficiency.

It is to be understood that the ranges provided herein include the stated range and any value or sub-range within the stated range. For example, a range of about 0.1 wt % to about 10 wt % should be interpreted to include not only the explicitly recited limits of about 0.1 wt % to about 10 wt %, but also to include individual values, such as 1 wt %, 5.5 wt %, 7.25 wt %, etc., and sub-ranges, such as from 2 wt % to about 8 wt %; from about 0.2 wt % to about 9 wt %, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for enhancing performance of a silicon-based negative electrode, the method comprising:
   pre-lithiating the silicon-based negative electrode in an electrolyte including a lithium salt dissolved in a solvent mixture consisting of dimethoxyethane (DME) and fluoroethylene carbonate (FEC) present in a volume to volume ratio ranging from 10 to 1 to 1 to 10, thereby forming a stable solid electrolyte interface layer on an exposed surface of the silicon-based negative electrode.

2. The method as defined in claim 1 wherein the silicon-based negative electrode includes an active material selected from silicon or a silicon alloy.

3. The method as defined in claim 1 wherein pre-lithiation is accomplished by:
   incorporating the silicon-based negative electrode into a half cell;
   soaking the silicon-based negative electrode in the electrolyte; and
   exposing the silicon-based negative electrode to a voltage potential for a time sufficient to form the stable solid electrolyte interface layer.

4. The method as defined in claim 1 wherein pre-lithiation is accomplished by:
   incorporating the silicon-based negative electrode into a half cell with a lithium-based counter electrode;
   soaking the silicon-based negative electrode in the electrolyte; and
   short circuiting the half cell.

5. The method as defined in claim 1 wherein the lithium salt is selected from the group consisting of $LiPF_6$, $LiAlCl_4$, LiI, LiBr, LiSCN, $LiB(C_6H_5)_4$, $LiAsF_6$, $LiCF_3SO_3$, $LiPF_4(C_2O_4)$ (LiFOP), $LiNO_3$, $LiBF_4$, $LiClO_4$, $LiN(CF_3SO_2)_2$ (LiTFSI), $LiB(C_2O_4)_2$ (LiBOB), $LiBF_2(C_2O_4)$ (LiODFB), $LiN(FSO_2)_2$ (LiFSI), $LiPF_3(C_2F_5)_3$ (LiFAP), $LiPF_4(CF_3)_2$, $LiPF_3(CF_3)_3$ and combinations thereof.

6. The method as defined in claim 1 wherein the stable solid electrolyte interface layer remains intact when exposed to lithium-polysulfide intermediates.

7. The method as defined in claim 1 wherein the stable solid electrolyte interface layer has a thickness of less than or equal to about 10 nm.

8. An electrolyte for pre-lithiating a silicon-based negative electrode, the electrolyte consisting of:
   a lithium salt; and
   a solvent mixture consisting of dimethoxyethane (DME) and fluoroethylene carbonate (FEC) present in a volume to volume ratio ranging from 10 to 1 to 1 to 10.

9. The electrolyte as defined in claim 8 wherein the lithium salt is selected from the group consisting of $LiPF_6$, $LiAlCl_4$, LiI, LiBr, LiSCN, $LiB(C_6H_5)_4$, $LiAsF_6$, $LiCF_3SO_3$, $LiPF_4(C_2O_4)$ (LiFOP), $LiNO_3$, $LiBF_4$, $LiClO_4$, $LiN(CF_3SO_2)_2$ (LiTFSI), $LiB(C_2O_4)_2$ (LiBOB), $LiBF_2(C_2O_4)$ (LiODFB), $LiN(FSO_2)_2$ (LiFSI), $LiPF_3(C_2F_5)_3$ (LiFAP), $LiPF_4(CF_3)_2$, $LiPF_3(CF_3)_3$ and combinations thereof.

10. A method for enhancing performance of a silicon-sulfur battery including a negative electrode and an electrolyte, the method comprising:
    adding to the electrolyte a lithium salt additive selected from the group consisting of $LiBF_2(C_2O_4)$ (LiODFB), $LiPF_6$, and combinations thereof,
    wherein an amount of lithium salt additive added to the electrolyte is greater than or equal to about 0.1 wt % to less than or equal to about 10 wt % of a total wt % of the electrolyte,
    wherein the electrolyte consisting of lithium bis(trifluoromethylsulfonyl)imide (LiTFSI), $LiPF_6$, or combinations thereof in a solvent mixture of dimethoxyethane (DME) and 1,3-dioxolane (DIOX), optionally $LiNO_3$, and optionally a Lewis base when $LiPF_6$ is present, and wherein the lithium salt additive forms a stable solid electrolyte interface layer on a surface of the negative electrode, wherein the stable solid electrolyte interface layer has a thickness of less than or equal to about 10 nm, and wherein the silicon-sulfur battery has a specific capacity of greater than 800 mAh/g for more than 80 cycles of the silicon-sulfur battery.

11. A silicon-sulfur battery, comprising:

a negative electrode including a silicon-based active material;

a positive electrode including a sulfur-based active material;

a separator positioned between the negative electrode and the positive electrode; and an electrolyte solution soaking each of the positive electrode, the negative electrode, and the separator, the electrolyte solution consisting of:

lithium bis(trifluoromethylsulfonyl)imide (LiTFSI), $LiPF_6$, or combinations thereof;

a solvent mixture of dimethoxyethane (DME) and 1,3-dioxolane (DIOX);

a lithium salt additive selected from the group consisting of $LiBF_2(C_2O_4)$ (LiODFB), $LiPF_6$, or combinations thereof, the lithium salt additive present in an amount ranging from about 0.1 wt % to about 10 wt % of a total wt % of the electrolyte solution; and optionally $LiNO_3$; and when $LiPF_6$ is present, the electrolyte solution also consists of a Lewis base, wherein the lithium salt additive forms a stable solid electrolyte interface layer on a surface of the negative electrode, wherein the stable solid electrolyte interface layer has a thickness of less than or equal to about 10 nm, and wherein the silicon-sulfur battery has a specific capacity of greater than 800 mAh/g for more than 80 cycles of the silicon-sulfur battery.

12. The silicon-sulfur battery as defined in claim 11 wherein the $LiPF_6$ is the lithium salt additive, and wherein the Lewis base is selected from the group consisting of dimethylacetamide (DMAc) and tributylamine (TBA).

13. The silicon-sulfur battery as defined in claim 12 wherein the Lewis base is present in an amount ranging from about 0.1 wt % and about 5 wt % of the total wt % of the electrolyte solution.

14. A pre-lithiation kit, comprising:

a negative electrode including a silicon-based active material; and an electrolyte solution for pre-lithiating the negative electrode, the electrolyte solution including a lithium salt dissolved in a solvent mixture consisting of dimethoxyethane (DME) and fluoroethylene carbonate (FEC) present in a volume to volume ratio ranging from 10 to 1 to 1 to 10.

* * * * *